United States Patent
Verthein et al.

(10) Patent No.: US 8,331,908 B2
(45) Date of Patent: Dec. 11, 2012

(54) MOBILE TELEPHONE HOSTED MEETING CONTROLS

(75) Inventors: William George Verthein, Bellevue, WA (US); Warren Vincent Barkley, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 32 days.

(21) Appl. No.: 12/896,926

(22) Filed: Oct. 4, 2010

(65) Prior Publication Data

US 2012/0083244 A1     Apr. 5, 2012

(51) Int. Cl.
*H04M 1/66*     (2006.01)
(52) U.S. Cl. ...... 455/411; 455/416; 455/403; 455/456.1
(58) Field of Classification Search .................. 345/156, 345/2.1, 179, 173; 455/420, 416, 456.6, 455/414.1, 177.1, 463, 411, 403, 550.1, 456.1; 715/730, 758; 709/204, 229, 206; 704/275, 704/E15.045; 340/8.1; 348/E7.083, 14.12, 348/734
See application file for complete search history.

(56) References Cited

U.S. PATENT DOCUMENTS

| | | | |
|---|---|---|---|
| 7,506,259 B1 | 3/2009 | Narayanaswami et al. | |
| 7,634,802 B2* | 12/2009 | Chiloyan | 726/4 |
| 2005/0035854 A1* | 2/2005 | Gupta et al. | 340/531 |
| 2005/0071879 A1* | 3/2005 | Haldavnekar et al. | 725/81 |
| 2005/0226468 A1* | 10/2005 | Deshpande et al. | 382/115 |
| 2007/0143440 A1 | 6/2007 | Reckamp et al. | |
| 2009/0253410 A1* | 10/2009 | Fitzgerald et al. | 455/411 |
| 2010/0122215 A1 | 5/2010 | MacGregor | |
| 2010/0169098 A1 | 7/2010 | Patch | |
| 2011/0282968 A1* | 11/2011 | Oliver et al. | 709/217 |
| 2011/0296517 A1* | 12/2011 | Grigoriev et al. | 726/12 |

OTHER PUBLICATIONS

Kela, et al, "Accelerometer-based Gesture Control for a Design Environment", Retrieved at <<http://www.springerlink.com/content/n813460153p6515m/fulltext.pdf>> vol. 10, Issue 5, Aug. 23, 2005, pp. 285-299.

Fried, Ina, "Gates: Natal to bring Gesture Recognition to Windows too", Retrieved at <<http://news.cnet.com/8301-13860_3-10286309-56.html>> Published Date: Jul. 14, 2009, pp. 3.

Scheible, et al., "MobiToss: A Novel Gesture based Interface for Creating and Sharing Mobile Multimedia Art on Large Public Displays", Retrieved at <<<<http://www.mediateam.oulu.fi/publications/pdf/1131.pdf>>In the proceeding of the 16th ACM international conference on Multimedia, Published Date: Oct. 26-31, 2008, pp. 957-960.

(Continued)

*Primary Examiner* — Jean A Gelin
*Assistant Examiner* — Mahendra Patel
(74) *Attorney, Agent, or Firm* — Hope Baldauff Hartman, LLC

(57) ABSTRACT

Technologies are described herein for controlling components associated with a room using a mobile phone. A gateway is configured to receive a command from a mobile phone. Upon receiving the command, the gateway determines whether the command is a room command or a presentation command. If the command is a room command, the gateway causes the room component to respond to the room component. If the command received is a presentation command, the gateway causes the presentation component to respond to the presentation command. A user may input commands to the mobile phone by making gestures with or on a screen of the mobile phone, by utilizing phone keys of the mobile phone, or by interacting with user interface controls displayed on the mobile phone.

19 Claims, 6 Drawing Sheets

OTHER PUBLICATIONS

Shaw, Russell, "Nintendo Wii-like Gesture control Technology coming to Mobile Phone Cameras", Retrieved at <<http://www.zdnet.com/blog/ip-telephony/nintendo-wii-like-gesture-control-technology-coming-to-mobile-phone-cameras/2504>>—Published Date: Oct. 3, 2007, p. 2.

Pering, et al., "Gesture Connect: Facilitating Tangible Interaction with a Flick of the Wrist", Retrieved at <<http://delivery.acm.org/10.1145/1230000/1227022/p259-pering.pdf?key1=1227022&key2=3178846721&coll=GUIDE&dl=GUIDE&CFID=93455545&CFTOKEN=96495723>>In the proceedings of the 1st international conference on Tangible and embedded interaction Feb. 15-17, 2007, p. 259-262.

Pering, et al., "Spontaneous Marriages of Mobile Devices and Interactive Spaces", Retrieved at http://delivery.acm.org/10.1145/1090000/1082020/p53-pering.pdf?key1=1082020&key2=4909846721&coll=GUIDE&dl=GUIDE&CFID=91673564&CFTOKEN=12936193>>In the proceedings of Communications of the ACM vol. 48, Issue 9, Sep. 2005, p. 53-59.

Villanueva, et al., "WallShare: A Collaborative Multi-pointer System for Portable Devices", Retrieved at <<http://www.info-ab.uclm.es/descargas/thecnicalreports/DIAB-09-10-1/wallshare-v1.pdf>> Retrieved Date: Jun. 14, 2010, p. 7.

"International Search Report" Application No. PCT/US2011/049472, mailed Feb. 28, 2012, 8 pages.

* cited by examiner

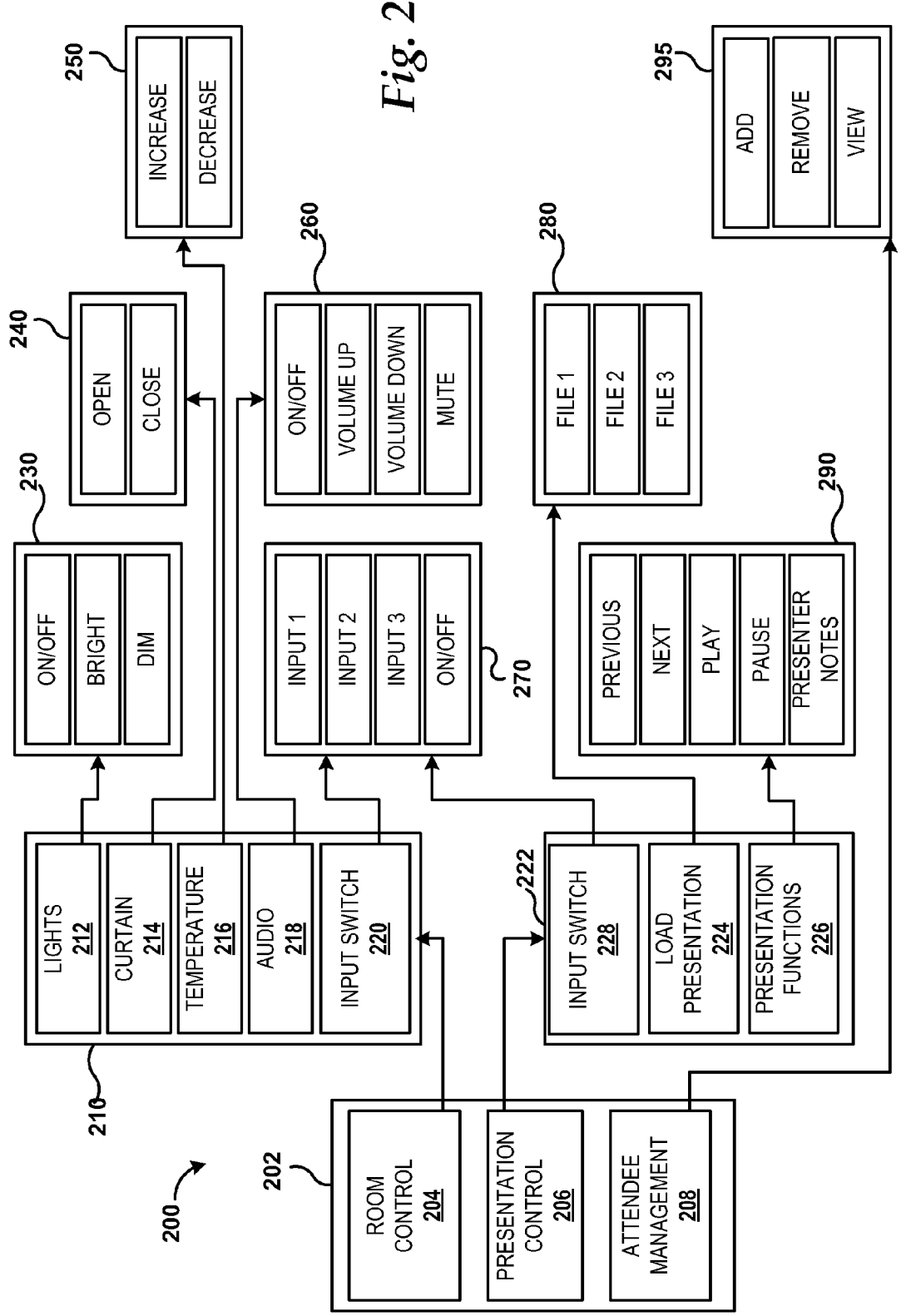

MOBILE TELEPHONE HOSTED MEETING CONTROLS

BACKGROUND

Many companies have dedicated meeting rooms where meeting attendees, such as employees, gather for meetings. These meeting rooms are often equipped with a control unit through which a meeting attendee can control various room components, such as a projector or projection screen located within the room. A control unit might also provide functionality for allowing a user to control the environmental conditions of the room. For instance, a user may use the control unit to brighten or dim the lights in a meeting room.

Meeting rooms may also be equipped with a presentation computer and a screen or projector for displaying slide presentations. A user input device, such as a mouse or keyboard, or a separate presentation remote control, may be utilized to control the presentation. Alternately, meeting participants may bring their own laptop computers and plug into a projector for displaying a presentation and for performing meeting control functions.

In many organizations, employees do not carry laptop computers. Therefore, it may be difficult for these employees to give slide presentations and perform meeting control functions in a conventional meeting room installation. Moreover, in meeting rooms that are equipped with a control unit for controlling room components, it is often the case that a meeting participant is not located near the control unit. As a consequence, a meeting participant may have to cross the meeting room to modify room controls or ask another user to do so. This type of activity can be disruptive to a meeting.

It is with respect to these and other considerations that the disclosure made herein is presented.

SUMMARY

Technologies are described herein for controlling components associated with a meeting room using a mobile telephone (which may be referred to herein as a "phone"). Through the utilization of the technologies and concepts presented herein, a mobile device, such as a mobile phone can be utilized to control room components, such as a projector or a projection screen, and presentation components, such as a presentation application program. By enabling meeting attendees to perform these functions from their mobile phones, the meeting attendees will no longer be required to have a laptop computer at a meeting or to leave their seats to modify the settings of room components.

According to one aspect disclosed herein, a gateway is configured to receive a command for controlling a component associated with a meeting room from a mobile device. Upon receiving the command, the gateway determines whether the command received is a room command for controlling a room component associated with the room. Room components might include light fixtures, an air conditioning unit, curtains, an audio system, a projector, and a projection screen.

If the command is a room command, the gateway causes the room component to respond to the room command. For instance, the gateway may transmit an instruction to a room controller, which in turn transmits an instruction to the room component to which the room command was directed. The room component, upon receiving the instruction, performs an action corresponding to the instruction.

If the gateway determines that the command received is not a room command, the gateway may then determine if the command received is a presentation command for controlling a presentation component associated with a presentation. Presentation components might include a presentation application, a slide presentation, and audio and video outputs of a presentation computer.

If the command received is a presentation command, the gateway causes the presentation component to respond to the presentation command. For instance, the gateway may transmit an instruction to a presentation computer, which in turn transmits an instruction to the presentation component to which the presentation command was directed. The presentation component, upon receiving the instruction, performs an action corresponding to the instruction.

Mobile phones through which commands are transmitted to the gateway may be equipped with software for receiving commands for controlling room components and presentation components from a user and for transmitting the commands to the gateway. A user may input commands to the mobile phone by making gestures with or on a screen of the mobile phone, by utilizing the phone keys of the mobile phone, or by interacting with user interface controls displayed on a screen of the mobile phone.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a user interface diagram illustrating a sequence of user interface controls displayed by a mobile phone in one embodiment for controlling room and presentation components, in accordance with some embodiments;

DETAILED DESCRIPTION

The following detailed description is directed to technologies for controlling components associated with a room using a mobile phone. Through an implementation of the various concepts and technologies presented herein, attendees in a meeting room may be able to control environmental conditions of the meeting room, such as the lighting and temperature of the room, using a mobile phone. In addition, attendees may also be able to control a presentation using the same mobile phone.

According to embodiments, the mobile phone may include a control application that allows the user to communicate with a gateway. The gateway is configured to communicate with both a room controller that controls room components and a presentation computer that controls presentation components associated with the room. User interface controls displayed by the mobile phone, gestures made on a mobile phone screen, and gestures made with a mobile phone itself may be utilized to control the room and presentation components. Additional details regarding these technologies will be provided below with regard to FIGS. 1-6.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
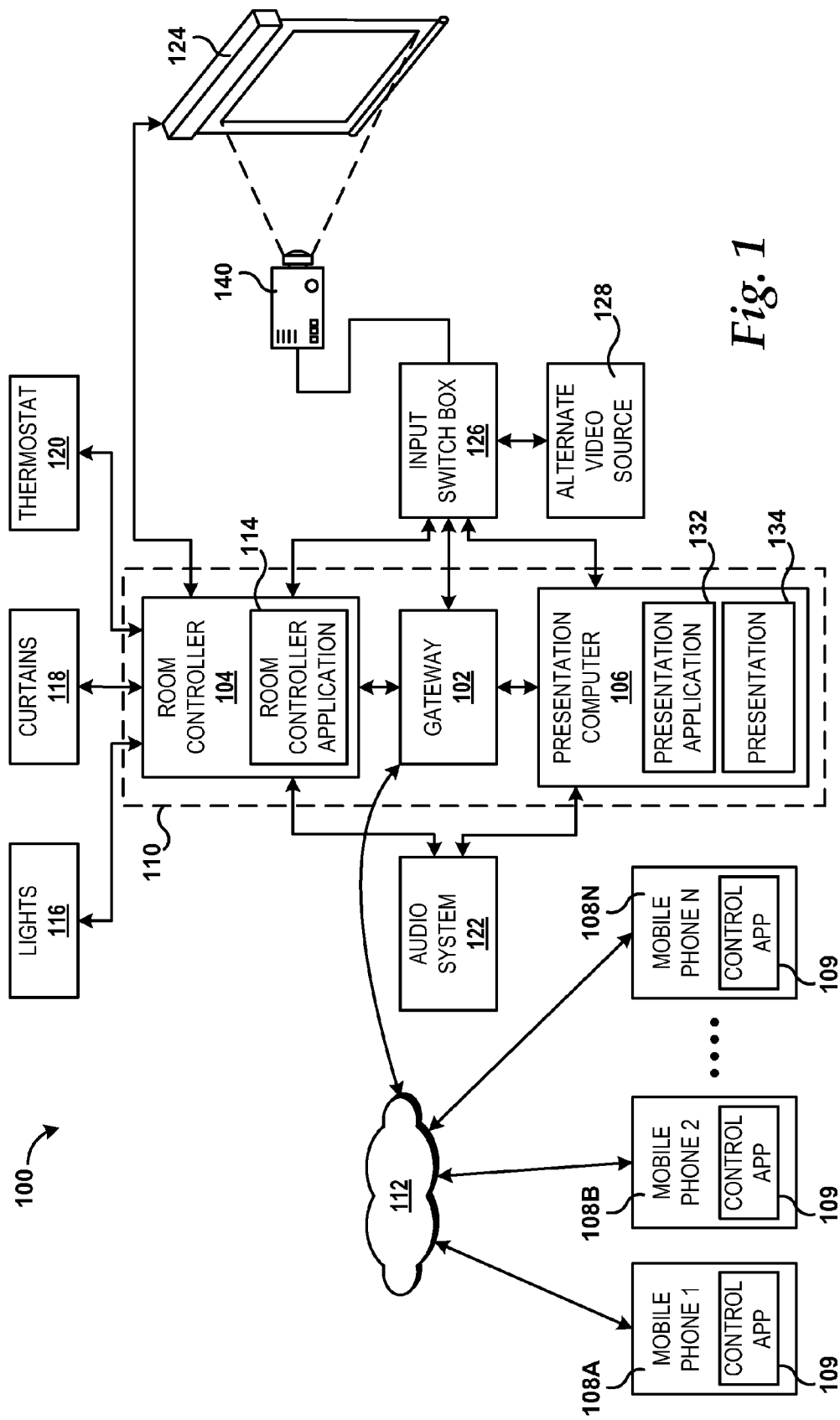
FIG. 1 is a system architecture diagram illustrating an architecture configured to enable mobile phones to control components associated with a meeting room, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for controlling components associated with a room using a mobile phone will be described. In particular, FIG. 1 is a system architecture diagram illustrating an architecture 100 configured to enable mobile phones to control components associated with a meeting room, in accordance with some embodiments. The system architecture 100 includes a gateway 102, a room controller 104, a presentation computer 106, an input switch box 126, and a number of mobile phones 108A-108N. The mobile phones 108A-108N may be collectively referred to as mobile phones 108. Throughout the rest of the disclosure, any one of the mobile phones 108A-108N may be referred to as a mobile phone 108.

According to embodiments, the gateway 102, the room controller 104, the presentation computer 106, and the input switch box 126 may be combined to operate as a single entity, as represented by a meeting controller 110, as shown in the dotted lines. Alternately, the gateway 102, the room controller 104, the presentation computer 106, and the input switch box 126 may be separate entities that are communicatively linked with one another via appropriate data communications interfaces. In various embodiments, the room controller 104 and/or the presentation computer 106 may be configured to perform the functions of the gateway 102, such that the gateway 102 is a part of the room controller 104 and/or the presentation computer 106.

The gateway 102 and the mobile phones 108 may be communicatively coupled via a network 112. The network 112 may be a cellular network or another type of wide-area wireless network. The network 112 might also be a personal area network ("PAN") or other suitable short-range network, which may be established using an appropriate short-range communications standard such as the BLUETOOTH communications standard. The network may alternately be a local area network ("LAN"), a wide area network ("WAN"), or other suitable network, which may be established using an appropriated wired or wireless communications link. Further, the network 112 may be the INTERNET. The network 112 might also be combinations of the various network types described above.

The gateway 102 is configured to receive a command for controlling a component from a mobile phone 108 and to determine the component to which the command is directed. Upon determining the component to which the command is directed, the gateway may be configured to determine whether to send the command to the room controller 104, the presentation computer 106, or an input switch box 126. The gateway 102 may also be configured to pass the command to the room controller 104 upon determining that the command is directed to a room component associated with the room controller 104. A room component is any component within a meeting room that is communicatively linked with the room controller 104 and capable of receiving and executing room commands from the room controller 104 such that the room controller 104 has control over some functionality of the room component. Examples of room components include a light fixture, curtains, an air conditioning unit, a projector, a projection screen, an audio system, and an input switch box. It should be appreciated that any component within the room may be a room component as long as some functionality of the room component is controllable by the room controller.

The gateway 102 may also be configured to pass the command to the presentation computer 106 upon determining that the command is directed to a presentation component associated with the presentation computer 106. A presentation component is any component within a meeting room that is in communicatively linked with the presentation computer 104 and capable of receiving and executing room commands from the presentation computer 104 such that the presentation computer 104 has control over some functionality of the presentation component. Examples of presentation components include a presentation application, a slide presentation, an audio component that outputs audio signals to an audio system, a video component that outputs audio signals to the input switch box 126. Further, the gateway 102 may be configured to pass the command to the input switch box 126 upon determining that the command is directed to the input switch box 126.

In various embodiments, the gateway 102 may also be configured to manage an attendee list such that only attendees on the list may be provided the authority to send commands from their mobile phones. Further, the gateway 102 may be configured to authenticate the credentials of an attendee through the attendee's mobile phone 108. Once the credentials of the attendee are authenticated, the gateway 102 may be configured to register the attendee on the attendee list. In this way, only registered attendees may send commands to control components associated with the room. The attendee list may be maintained on a server computer system executing appropriate calendaring and meeting software, such as a server computer executing the EXCHANGE server component from MICROSOFT CORPORATION of Redmond, Washington.

The gateway 102 may be implemented as a hardware component, as software, or as a combination of hardware and software. According to various embodiments, a personal computer, such as a laptop computer or a desktop computer, or any other computing device may also be implemented as the gateway 102, as long as the computing device is capable of receiving commands from a mobile phone 108 and causing at least one of the room components and the presentation components to respond to the command received from the mobile phone 108.

The room controller 104 may include a room controller application 114 configured to receive one or more instructions associated with a room command from the gateway 102. A room command is a command that causes a room component to which the room command was directed, to perform a function corresponding to the room command. For example, a room command may be a command to increase the brightness in the room. This room command causes the brightness of one or more light fixtures in the room to increase. It should be appreciated that a room command does not have to be issued from a mobile phone, but can be generated by the gateway 104 itself Further, the room controller application 114 may be configured to execute the received instructions, thereby causing a room component to respond to the room command received by the gateway from the mobile phone 108. These instructions may correspond to room commands that the gateway 102 received from the mobile phone 108 or commands that were generated by the gateway 102.

The room commands may be requests to alter some functionality provided by the room components. For instance, the room command may be a request from the mobile phone 108A to dim the brightness of lights 116 in a meeting room connected to the room controller 104 by way of an appropriate interface. Another example of a room command may be a request from the mobile phone 108B to increase the temperature of the room. According to various embodiments, the room controller 104 may be configured to communicate with various room components that are responsible for setting the environmental conditions of the room and/or other electronic components present within the room that may be controllable by a user. For instance, in accordance with the embodiment presented in FIG. 1, the room controller 104 may control one or more light fixtures 116 that provide light to the room, one or more curtains 118 that may restrict light from entering through a window of the room, and a thermostat 120 for controlling the temperature of the room. It should be appreciated that the environmental conditions of the room may include the amount of artificial lighting in the room, the amount of natural lighting in the room, the temperature of the room, and the like.

The room controller 104 may also be configured to control other room components associated with a room. For instance, the room controller 104 may control one or more functions associated with an audio system 122, including switching on/off the audio system 122, adjusting the volume of speakers in the room, switching on/off a microphone in the room, and the like. Further, the room controller 104 may also be configured to control one or more functions associated with the projection screen 124, including lowering and raising the projection screen 124. According to embodiments, the room controller 104 may also be configured to control one or more functions of an input switch box 126, such as switching on/off the input switch box. Other functions associated with the input switch box 126 may be controlled directly through the gateway 102 or through the presentation computer 106, such as selecting a video source that is to be projected by the projector 140 on the projection screen 124, and the like.

As described above, the room controller 104 is configured to control various functions associated with room components. The room controller 104 may receive a room command from the gateway 102 to lower the projection screen 124. Upon receiving this command, the room controller application 114 may be configured to cause the projection screen 124 to be lowered. The room controller application 114 may then receive a room command to power on the audio system 122. Upon receiving this command, the room controller application 114 may be configured to cause the audio system 122 to be powered on. In this way, an attendee within the room may control various aspects of the room components, such as the light fixtures 116, the curtains 118, the thermostat 120, the audio system 122, the projection screen 124, the input switch box 126, among others, simply through the use of a mobile phone.

As briefly described above, the gateway 102 may also communicate with a presentation computer 106, which may be configured to control presentation components, such as an audio module (not shown) that sends audio input signals from the presentation computer 106 to the audio system 122 and a video module (not shown) that sends video input signals from the presentation computer 106 to the input switch box 126. The presentation computer 106 might also include other presentation components, such as a presentation application 132 and at least one presentation 134. The presentation application 132 may be configured to receive presentation commands from the gateway 102. The presentation application 132 may then execute the presentation commands.

An example of a presentation command may be a request from a user to begin a presentation 134 stored in the presentation computer 106. Upon receiving the presentation command from the gateway 102, the presentation computer 106 may send an instruction to the presentation application 132 to begin the presentation 134. Another example of a presentation command may be to mute the volume of the presentation. The gateway may send the command to the presentation computer 106, which may send an instruction to the audio module to stop sending an audio input signal to the audio system 122, thereby muting the volume of the presentation 134. In this way, an attendee within the room may generally control various aspects of the presentation components, such as the presentation application 132, the presentation 134, the audio system 122, the input switch box 126, and the like, simply through the use of a mobile phone 108A. In one embodiment, the presentation application 132 is the POWERPOINT presentation application program from MICROSOFT CORPORATION. It should be appreciated, however, that other presentation applications from other manufacturers might be utilized.

According to embodiments, the input switch box 126 may be configured to provide a video signal to the projector 140 for projecting the video on the projection screen 124. The input switch box 126 may further be configured to receive instructions corresponding to commands sent from a mobile phone that are directed to the input switch box 126. In various embodiments, the input switch box 126 receives the instructions from either the room controller 104 or the presentation computer 106. In such embodiments, commands related to switching the input switch box on and/or off are passed to the input switch box through the room controller 104. Commands related to selecting an input source from which to send a video signal to the projector 140 may be passed to the input switch box 126 through the presentation computer 106. Alternatively, commands related to selecting an input source from which to send a video signal to the projector 140 may be passed to the input switch box 126 directly from the gateway 102.

The mobile phone 108 may be any type of mobile phone that is capable of running a control application 109 that may be configured to present a user with a sequence of user interface controls, one embodiment of which is shown in FIG. 2. In addition, the mobile phone 108 may be capable of receiving user input from the user for entering commands through the control application 109. The mobile phone 108 may also be capable of communicating with the gateway 102 over the network 112. The control application 109 may be computer-executable instructions that allow a user to interact with the gateway through the user's mobile phone 108. According to embodiments, the mobile phone 108 is a smartphone, such as the IPHONE from APPLE COMPUTER, an ANDROID operating system-based smartphone, or another type of smartphone. Other non-smartphone mobile telephones might also be utilized when configured with an appropriate control application 109. Additional details regarding the operation of the components shown in FIG. 1 will be described below with reference to FIGS. 2-6.

According to embodiments, the mobile phone 108 is equipped with a touch sensitive display screen. Through the touch sensitive display screen and software executing on the mobile phone 108, user input "gestures" may be detected. Additionally, the mobile phone 108 may be equipped with various orientation sensors, ambient light detection sensors, and other sensors that allow the mobile phone 108 to detect its own location, orientation, map heading, and environmental conditions. As will be described in detail below, gestures made on the display screen, user interface controls displayed on the display screen, and gestures made with the mobile phone 108 itself may be utilized to control room components.

Referring now to FIG. 2, a user interface diagram illustrating a sequence of user interface controls displayed by a mobile phone 108 in one embodiment for controlling room and presentation components is shown. As described above, attendees within the meeting room may use a mobile phone 108 to control various aspects of the components within the meeting room. To do so, the attendee may cause the control application 109 to be executed on their mobile phone 108. When the control application 109 is executed, the attendee is presented with one or more user interface controls including selectable icons on the display screen of the attendee's mobile phone 108. By navigating through the various user interface controls by selecting icons, the attendee may be able to control components associated with the room.

According to embodiments, the control application 109 on the mobile phone 108 may display a main user interface control 202 that presents the attendee with three selectable icons, a room control icon 204, a presentation control icon 206, and an attendee management icon 208. The arrows shown in FIG. 2 indicate one or more additional user interface controls that may appear on the screen of the mobile phone 108. It should be appreciated that the user interface controls displayed in FIG. 2 may be associated with one embodiment of the present disclosure. In other embodiments, other user interface controls may include the same, similar or different icons and user interface controls.

In one embodiment, a user can control functionality provided by room components by selecting the room control icon 204. Upon selection of the room control icon 204, the mobile phone 108 presents a room user interface control 210, which includes selectable icons 212-220 associated with the one or more room components. A user may be able to control the light fixtures 116 by selecting the lights icon 212. Upon selection of the lights icon 212, the mobile phone 108 presents a lights user interface control 230, which includes selectable icons for controlling aspects of the light fixtures 116, such as an on/off icon for switching the lights on or off, a bright icon for increasing the brightness provided by the light fixtures 116, and a dim icon for lowering the brightness provided by the light fixtures 116. In various embodiments, each light fixture 116 in the room may have a separate user interface control for controlling the intensity of the particular light fixture 116.

In a similar fashion, a user may be able to control the curtains 118 in a meeting room by selecting the curtains icon 214. Upon selection of a curtains icon 214, the mobile phone 108 presents a curtains user interface control 240, which includes selectable icons for controlling aspects of the curtains 118, such as an open icon for opening the curtains 118 and a close icon for drawing the curtains 118.

A user may be able to control a thermostat 120 in a meeting room by selecting a temperature icon 216. Upon selection of the temperature icon 216, the mobile phone 108 presents a temperature user interface control 250, which includes selectable icons for controlling aspects of the thermostat 120, such as an icon for increasing the temperature in the room, and an icon for decreasing the temperature of the room.

A user may also be able to control the audio system 122 by selecting an audio icon 218. Upon selection of the audio icon 218, the mobile phone 108 presents an audio user interface control 260, which includes an on/off icon for switching the audio system 122 on/off, a volume up icon for increasing the volume, a volume down icon for decreasing the volume, and a mute icon for muting the volume of the audio system 122. It should be appreciated that in various embodiments, a user may be able to control the audio input signals being sent from the presentation computer 106 to the audio system 122 through the presentation computer 106. In such embodiments, the user may control the audio input signals being sent to the audio system 122 through a user interface control that is associated with the presentation computer 106.

A user may also be able to control the input switch box 126 by selecting an input switch icon 220. Upon selection of the input switch icon 220, the mobile phone 108 presents an input switch user interface control 270 for selecting which input signal is to be projected by the projector 140 or another display device. The input switch user interface control 270 may include an input one icon for projecting a first input signal provided by the video module of the presentation computer 106, an input two icon for projecting a second input signal provided by the alternate video source 128, an input three icon for projecting a third input signal provided by another video source (not shown), and an on/off icon for switching the projector 140 on or off. It should be appreciated that other components associated with the room may be controlled via selectable icons presented to a user via the mobile phone 108.

According to one embodiment, a user may also be able to control presentation components, such as the presentation computer 106 and the presentation files accessible by the presentation computer 108, by selecting the presentation control icon 206 on the main user interface control 202. In response to a selection of the presentation control icon 206, the mobile phone 108 presents a presentation user interface control 222, which includes selectable icons 224-228 associated with the one or more presentation components.

As discussed above, the input switch box 126 may be configured to be controlled by either the room controller 104 or the presentation computer 106. To control the input switch box 126 through the presentation computer 106, a user may be able to control the input switch box 126 by selecting the input switch icon 228, which is similar to the input switch icon 220. As described above with respect to input switch icon 220, upon the user selecting the input switch icon 228, the mobile phone 108 presents an input switch user interface control 270 for selecting which input signal is to be projected by the projector 140.

Following the selection of the presentation user interface control 222, a user may select a load presentation icon 224 to load a presentation 134. Upon the user selecting the load presentation icon 224, the mobile phone 108 may present a file list user interface control 280 for selecting a presentation 134 which the presentation computer 106 selected for presenting. The file list user interface control 280 includes a file one icon for presenting the presentation 134, a file two icon for presenting a second presentation (not shown), and a file three icon for presenting a third presentation (not shown). The listed files may be stored on the presentation computer 106, on the mobile phone 108, or in another local or network-accessible location.

A user may further control a loaded presentation by selecting a presentation functions icon 226. Upon the user selecting the presentation functions icon 226, the mobile phone 108 presents a functions user interface control 290 for selecting an operation on the loaded presentation 134. The functions user interface control 290 includes a previous icon for navigating to a previous slide of the presentation 134, a next icon for navigating to a next slide of the presentation 134, a play icon for playing a slideshow of the presentation 134, a pause icon for pausing the presentation 134, and a presenter notes icon for presenting the user with presenter notes associated with the presentation 134 on the mobile phone 108.

In various embodiments, attendees at a meeting may be able to manage an attendee list via a mobile phone 108. In particular, a user may select the attendee management icon 208 on the main user interface control 202. Upon the user selecting the attendee management icon 208, the mobile phone 108 presents an attendee management user interface control 295, which includes an add icon for adding an attendee to the attendee list, a remove icon for removing an attendee from the attendee list, and a view icon for viewing the attendee list. As discussed above, the attendee list may be stored in an appropriate location, such as in a server-based calendaring and meeting application program.

It should be appreciated that the sequence of user interface controls shown in FIG. 2 may be presented, as shown, on a touch or non-touch screen of the mobile phone 108. In various embodiments, the icons may be selected by pressing an appropriate location on the touch screen and/or through buttons and/or a pointing device on the mobile phone. It should further be appreciated that upon selecting the icons in the user interface controls 230-295, additional user interface controls may be presented. In various embodiments, gestures made on the screen of the mobile phone 108 or gestures made with the mobile phone 108 may be used to bypass or supplement some of the user interface controls. A detailed discussion regarding the use of gestures to control room functions is provided below with reference to FIGS. 3A and 3B.

Figure 3B:
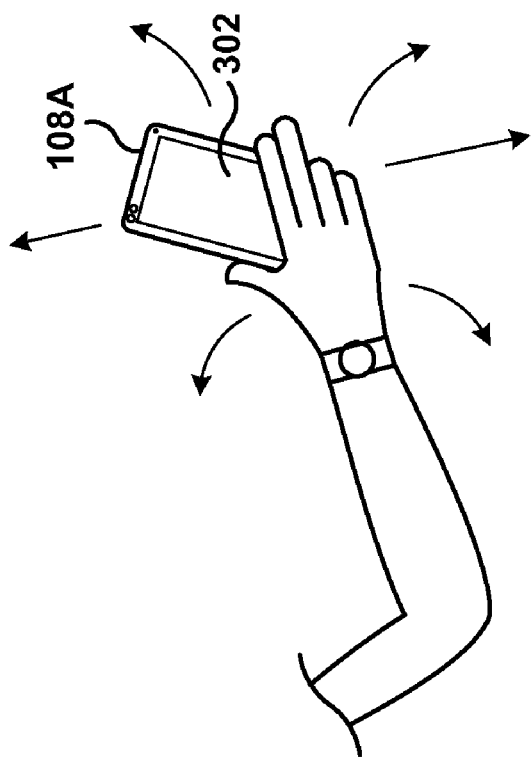
FIG. 3B is a pictorial diagram illustrating how gestures made with a mobile telephone may be utilized to control meeting room components, in accordance with some embodiments.
Figure 3A:
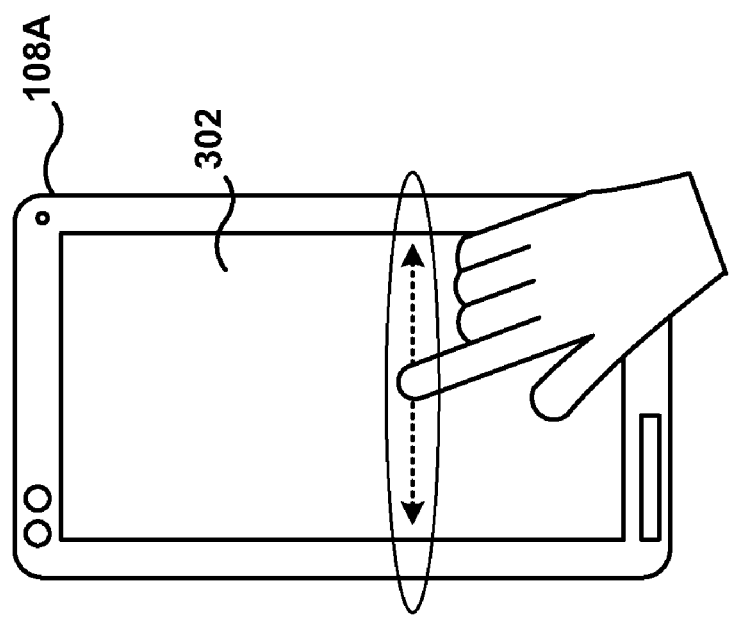
FIG. 3A is a pictorial diagram illustrating how gestures made on a screen of a mobile telephone may be utilized to control meeting room components, in accordance with some embodiments.

Referring now to FIG. 3A, a pictorial diagram illustrating how gestures made on a screen of a mobile phone may be utilized to control meeting room components will be described. As known in the art, a gesture is a pre-defined motion made over time. As discussed above, a gesture may be made on a touch screen of the mobile phone 108 or may be made by moving the mobile phone 108 in three-dimensional space. In various embodiments, a user may control various functions of the components associated with the room using gestures. The control application 109 may be configured to detect a gesture, to determine if the detected gesture matches a command for controlling with a component in the meeting room, and to send the command corresponding to the gesture to the gateway 102.

In one embodiment, the control application 109 may utilize a database that stores pre-defined gestures and a corresponding room command. In this way, when the mobile phone receives a gesture, the control application 109 may perform a lookup in the database to determine the room command with which the gesture is associated. Further, the control application 109 may be configured to allow a user to define a new gesture that corresponds to a specific room command. For instance, a user may define a gesture, such as tapping the screen twice to correspond to a room command for starting a presentation 134.

In one embodiment, the control application 109 of the mobile phone 108 may need to operate in a gesture recognition mode for receiving commands in the form of gestures. The gesture recognition mode may allow the mobile phone 108 to respond to gestures only when the gesture recognition mode is in operation. In this way, accidental gestures made with or on the mobile phone 108 may not be executed by the control application 109. The gesture recognition mode may be activated by pressing a key on the mobile phone 108 or through other known mobile phone user input components, such as the touch screen 302.

While operating the control application 109 in the gesture recognition mode, a user may simply slide his finger from left to right on the screen 302 of the mobile phone 108 to send a command to the presentation computer 106 to navigate a loaded presentation 134 to a next slide. In a similar fashion, a user may slide his finger from top to bottom on the screen 302 of the mobile phone 108 to send a command to the room controller 104 to lower the volume of the audio system 122.

In various embodiments, a gesture made on the screen 302 of the mobile phone 108 may supplement the user interface controls presented to the user. In this way, a gesture made on the screen 302 of the mobile phone 108 may be associated with the component represented by an icon selected on the user interface controls. For instance, if the user wants to increase the brightness provided by the lights 116 in the room, the user may first navigate to the lights user interface control 230. The user may then slide his finger from the bottom to the top of the screen to increase the brightness provided by the light fixtures in the room. Conversely, if the user would like to dim the brightness of the room, he may simply slide his finger from the top to the bottom of the screen after navigating to the lights user interface control 230, thereby causing a decrease in the intensity of the lights 116. In order to avoid pressing any icons on the screen 302 while making the gesture on the screen 302, a user may first need to activate the gesture recognition mode on the mobile phone 108.

Referring now to FIG. 3B, a pictorial diagram illustrating how gestures made with a mobile phone may be utilized to control meeting room components will be described. In FIG. 3B, the user is not making gestures on the screen 302 of the mobile phone 108, but rather making gestures with the mobile phone, such as by moving his arm, wrist, or hand while holding the mobile phone 108. A gesture, such as moving the mobile phone 108 from left to right, may correspond to a command to navigate to the next slide of the presentation 134, for instance. Similarly, a gesture, such as moving the mobile phone 108 from right to left may correspond to a command to navigate to the previous slide of the presentation 134. According to embodiments, various other movements may correspond to other commands for controlling the components within the room.

Figure 4:
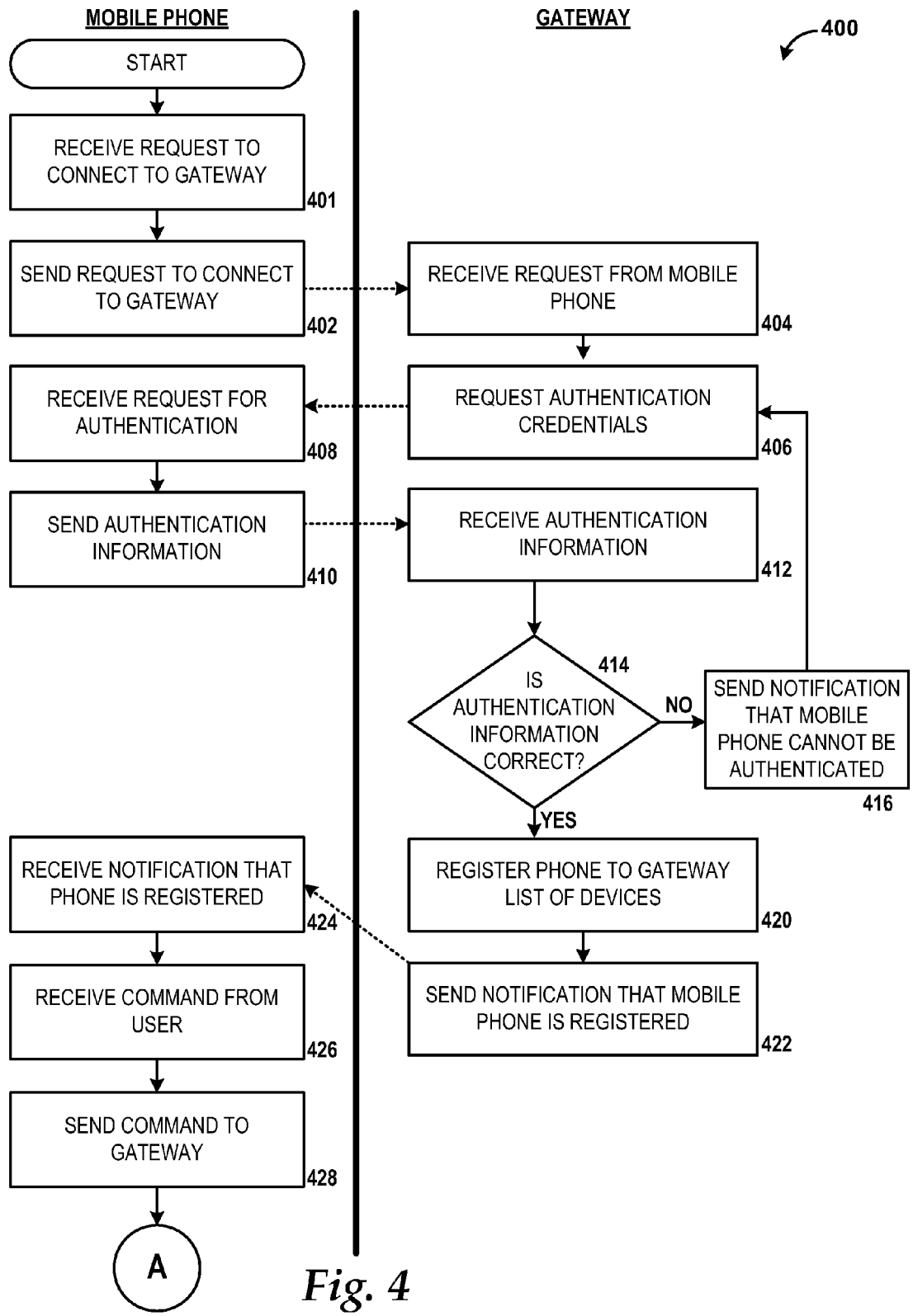
FIG. 4 is a flow diagram illustrating aspects of one process disclosed herein for registering a mobile phone with a meeting room gateway, in accordance with some embodiments.

Referring now to FIG. 4, additional details regarding the operation of the mobile phone 108 and the gateway 102 will be described. In particular, FIG. 4 is a flow diagram illustrating a method for registering a mobile phone with the gateway 102, in accordance with some embodiments. As described briefly above, a mobile phone 108 might not be permitted to control room components until the mobile phone 108 has been registered with or authorized by the gateway 102.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

The routine 400 shown in FIG. 4 begins at operation 401, where the mobile phone 108 receives a request from a user to launch the control application 109 for controlling the components within the room via the gateway 102. From operation 401, the routine 400 proceeds to operation 402, where the mobile phone 108 sends a request to connect to the gateway 102. From operation 402, the routine 400 proceeds to operation 404, where the gateway 102 receives the request to connect from the mobile phone 108.

From operation 404, the routine 400 proceeds to operation 406, where the gateway 102 requests authentication credentials of the user using the mobile phone 108. The authentication credentials may be a username and password or a device identifier ("ID") associated with an authorized attendee or the mobile phone 108. From operation 406, the routine 400 proceeds to operation 408, where the mobile phone 108 receives the request for authentication. From operation 408, the routine 400 proceeds to operation 410, where the mobile phone 108 sends the authentication credentials to the gateway 102. In one embodiment, the user of the mobile phone 108 may be authenticated by establishing a communication over a secured network, such as BLUETOOTH or WI-FI. From operation 410, the routine 400 proceeds to operation 412, where the gateway 102 receives the authentication credentials.

From operation 412, the routine 400 proceeds to operation 414, where the gateway 102 authenticates the received credentials. This may include checking to see if a username and password are valid, or whether the mobile phone is a registered device on the gateway 102 or the network 112. If the authentication credentials are not valid, the routine 400 proceeds to operation 416, where the gateway 102 sends a notification to the mobile phone 108 that the mobile phone 108 cannot be authenticated. From operation 416, the routine 400 returns to operation 406.

If, at operation 414, the gateway 102 determines that the received authentication credentials are valid, the routine 400 proceeds to operation 420, where the gateway adds the mobile phone to a list of registered devices. The list of registered devices is a list of communication devices, such as mobile phones that have been authenticated by the gateway 102.

From operation 420, the routine 400 proceeds to operation 422, where the gateway 102 sends a notification to the mobile phone 108 that the mobile phone 108 is registered with the gateway 102. In this way, the mobile phone 108 is instructed that it may begin controlling various components within the room via the gateway 102. From operation 422, the routine 400 proceeds to operation 424, where the mobile phone 108 receives the notification that the mobile phone 108 is registered.

From operation 424, the routine 400 proceeds to operation 426, where the mobile phone 108 receives a request from a user to control a component within the room. From operation 426, the routine 400 proceeds to operation 428, where the mobile phone 108 sends a command associated with the received request to control a component within the room to the gateway 102. The gateway 102 then receives and processes the command. This will be described in greater detail below with regard to FIG. 5.

Figure 5:
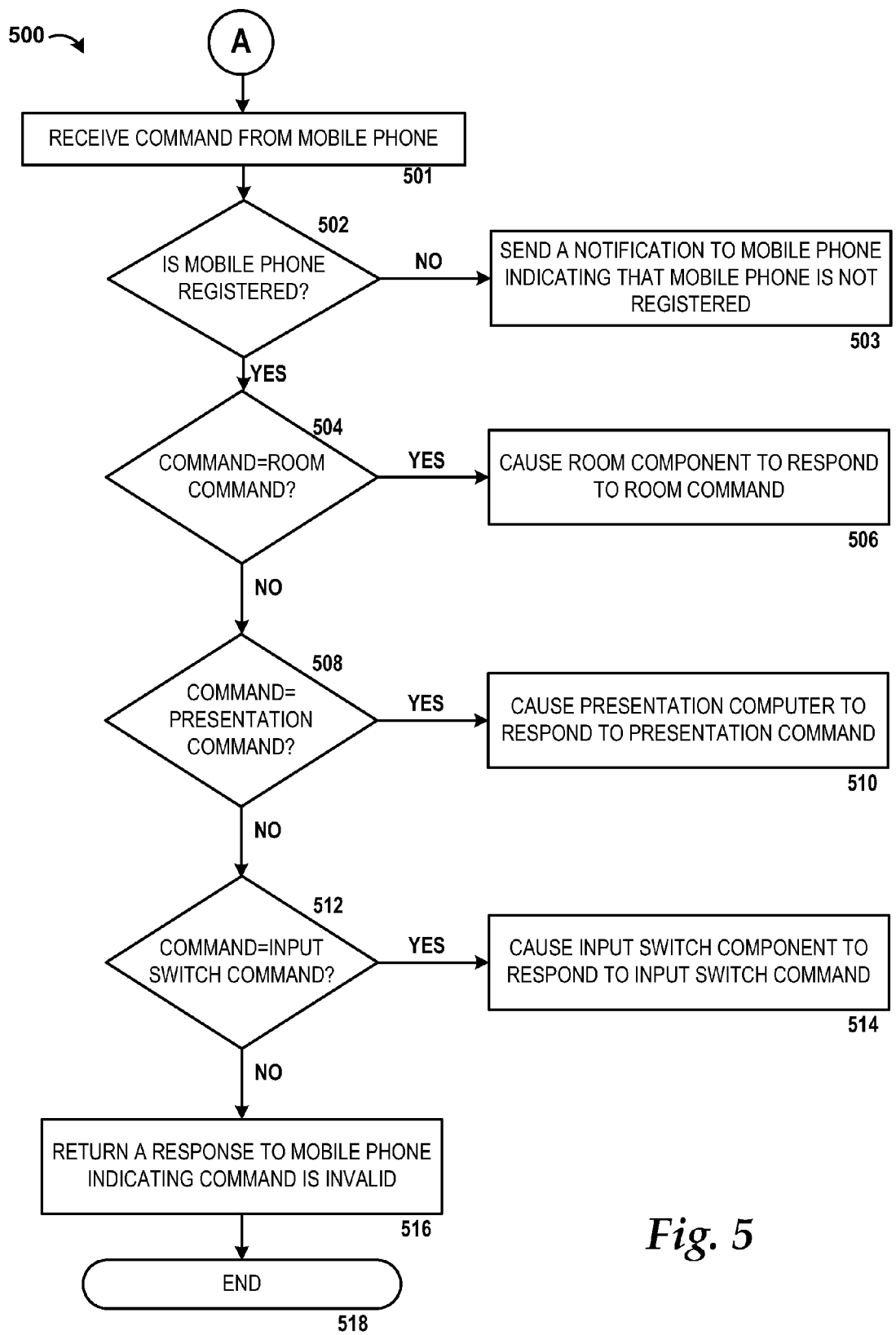
FIG. 5 is a flow diagram illustrating aspects of one process disclosed herein for processing a command from a mobile phone that is received by a meeting room gateway, in accordance with some embodiments.

Referring now to FIG. 5, additional details regarding the operation of the gateway 102 will be described. In particular, FIG. 5 is a flow diagram illustrating a routine 500 performed by the gateway 102 for processing a command from a mobile phone 108. In FIG. 5, a routine 500 begins at operation 501, where the gateway 102 receives a command from the mobile phone 108. As discussed above, the command may be a room command for controlling a room component within the room, a presentation command for controlling presentation components such as a presentation 134 being presented by the presentation computer 106, or an input switch command for controlling an input switch component, such as the input switch box 126.

From operation 501, the routine 500 proceeds to operation 502, where the gateway 102 determines if the mobile phone 108 sending the command is registered with the gateway 102. In one embodiment, the gateway 102 may identify the mobile phone 108 that sent the command by inspecting data packets received from the mobile phone 108. Upon identifying the mobile phone 108, the gateway 102 determines if the mobile phone 108 is registered with the gateway 102. If the mobile phone 108 is not registered with the gateway 102, the routine 500 proceeds to operation 503, where the gateway 102 sends a notification to the mobile phone 108 indicating that the mobile phone 108 is not registered with the gateway 102.

If, at operation 502, the gateway 102 determines that the mobile phone 108 sending the command is registered with the gateway 102, the routine 500 proceeds from operation 502 to operation 504, where the gateway 102 determines if the command received from the mobile phone 108 is a room command. Upon determining that the command is a room command, the routine 500 proceeds to operation 506, where the gateway 102 passes the command to the room controller 104. The room controller 104 may then generate an instruction corresponding to the command and send the instruction to the appropriate room component. The appropriate room component will then implement the command received from the mobile phone 108. For instance, if the room command is a request to dim the lights 116, the gateway 102 may pass the request to dim the lights to the room controller 104. The room controller 104 may then generate and send an instruction to reduce the power being supplied to the lights 116, thereby causing a decrease in the brightness of the light fixture 116.

In another example, if the room command is a request to draw the curtains 118, the gateway 102 may pass the request to draw the curtains 118 to the room controller 104. The room controller 104 may then generate and send an instruction to the curtains 118, thereby causing a motor associated with the curtains to draw the curtains 118.

According to embodiments, the gateway 102 may identify the room component to which the command is directed and generate an instruction corresponding to the command received from the mobile phone 108. Upon generating an instruction, the gateway 102 may send the generated instruction to the room controller 104. The room controller 104, in turn, responds to the instruction sent by the gateway 102 by generating and sending an instruction corresponding to the instruction received from the gateway 102 to the appropriate room component.

If, at operation 504, the gateway 102 determines that the command is not a room command, the routine 500 proceeds to operation 508, where the gateway 102 determines if the command is a presentation command. Upon determining that the command is a presentation command, the routine 500 proceeds to operation 510, where the gateway 102 sends the command to the presentation component, via the presentation computer 106. In various embodiments, the gateway 102 may pass the command to the presentation computer 106, which then generates and sends instructions to a particular presentation component to execute the presentation command issued from the mobile phone 108. For instance, if the presentation command is a request to navigate to a next slide of the presentation 134, the gateway 102 may pass the command to the presentation computer 106, thereby causing the presentation computer 106 to respond to the command by sending instructions to the presentation application 132 to navigate to the next slide of the presentation 134. In another example, if the presentation command is a request to load a presentation 134, the gateway 102 may pass the command to the presentation computer 106. The presentation computer 106 may then generate and send an instruction corresponding to the command received from the mobile phone 108 to the presentation application 132, which responds to the instruction by loading the presentation 134.

In various embodiments, multiple commands may be generated upon receiving a single instruction from a mobile phone 108. For instance, when the gateway 102 receives a command to start a presentation 134, the gateway 102 determines whether other components associated with the room and useful in presenting the presentation are configured for delivery of the presentation 134. The gateway 102 may have a list of pre-defined operations that the gateway 102 needs to perform upon receiving the command to start a presentation 134 from the mobile phone 108. The list of pre-defined operations may include determining which components are necessary for starting the presentation, determining if those components are powered on and ready for the presentation, and upon determining that they are not ready for the presentation, sending commands to become ready for the presentation.

For instance, if at the time of receiving the command to start a presentation 134, the projector 140 is turned off and the projection screen 124 is raised, the gateway 102 may be configured to execute pre-defined operations that are associated with presenting a presentation 134. This may include sending requests to the room controller 104 to turn on the projector 140, lower the projection screen 124, power on the audio system 122, and select the presentation computer as the video input source at the input switch box 126. In this way, when the presentation computer 106 receives the single command for starting the presentation 134, the presentation 134 may be displayed on the projection screen 124 via the projector 140 and the audio of the presentation 134 may be projected via the audio system 122. It should be appreciated from this example that one or more room components, pre-sentation components, and input switch components may be controlled through a single command.

If, at operation 508, the gateway 102 determines that the command is not a presentation command, the routine 500 proceeds to operation 512, where the gateway 102 determines if the command is an input switch command. Upon determining that the command is an input switch command, the routine 500 proceeds to operation 514, where the input switch box 126 is caused to respond to the input switch command. In various embodiments, the gateway 102 may pass the command to the input switch box 126, either directly or via the presentation computer 106 or the room controller 104, causing the input switch box 126 to respond to the input switch command.

If, at operation 512, the gateway 102 determines that the command is not an input switch command, the routine 500 proceeds to operation 512, where the gateway 102 sends a notification to the mobile phone 108 indicating that the command is invalid. From operation 516, the routine 500 proceeds to operation 518, where it ends.

Although the various embodiments described throughout the specification refer to the use of a mobile phone, it should be appreciated that any mobile device may be capable of performing the functions of the mobile phone described herein. For instance, mobile devices, such as the APPLE IPAD, the APPLE ITOUCH, a touch screen remote control, and the like may be utilized to perform the various functions of the mobile phone 108 described herein.

Figure 6:
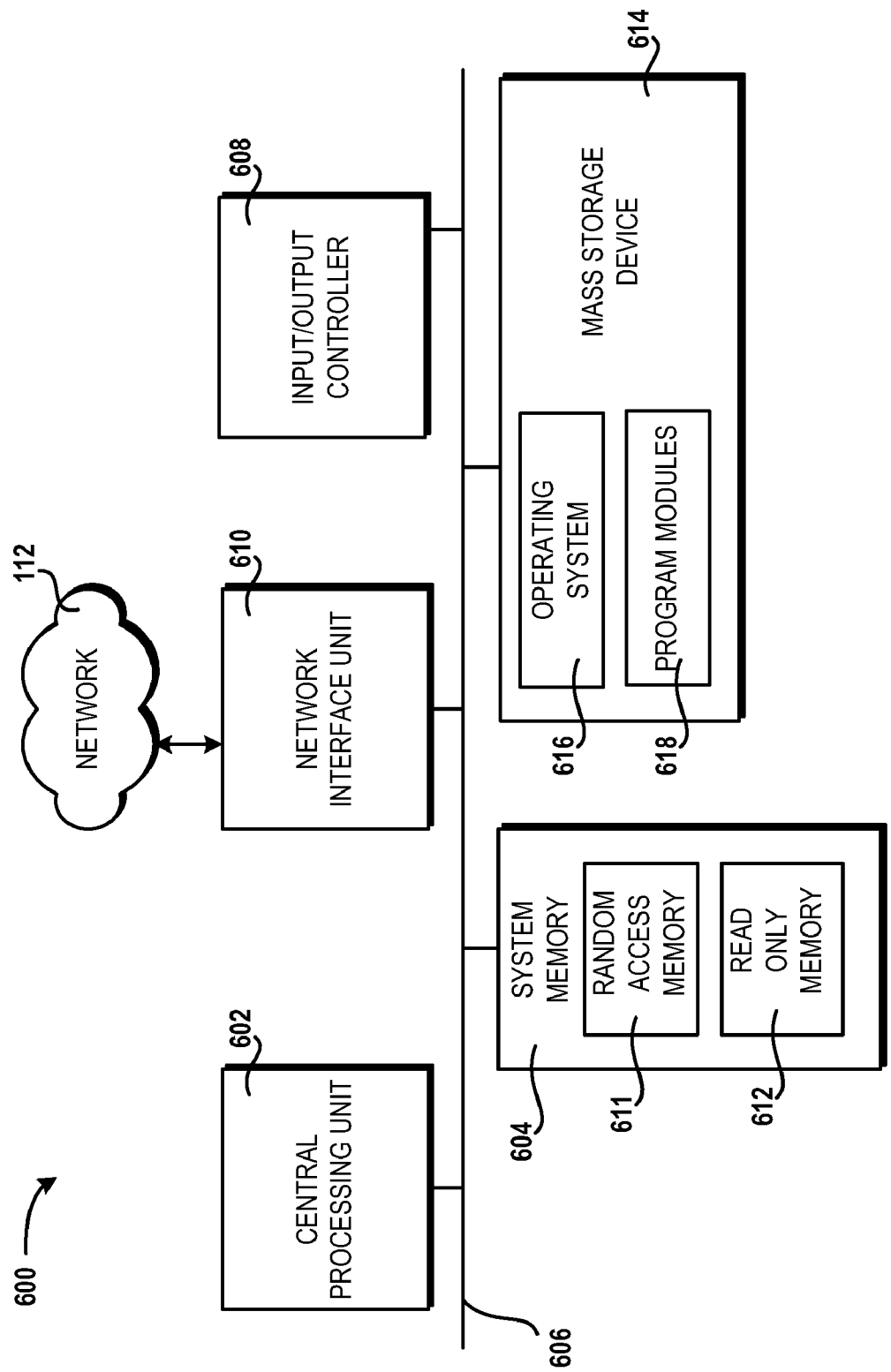
FIG. 6 is a computer architecture diagram showing an illustrative computer hardware architecture for a computing system capable of implementing aspects of the embodiments presented herein.

Turning now to FIG. 6, an example computer architecture diagram showing a computer 600 is illustrated. The computer architecture shown in FIG. 6 may be utilized to implement the gateway 102, the room controller 104, the presentation computer 106, and the mobile phone 108.

The computer 600 includes a central processing unit ("CPU") 602, a system memory 604 that includes a random access memory ("RAM") 611 and a read only memory ("ROM") 612, and a system bus 606 that couples the memory 604 to the CPU 602. The computer 600 may further include a mass storage device 614 for storing one or more operating systems 616 and program modules 618. Examples of the program modules 618 may include the control application 109 and application programs that are configured to perform the functions of the gateway 102, the room controller 104, or the presentation computer 106, as described above with respect to FIGS. 1-5.

The mass storage device 614 may be connected to the CPU 602 through a mass storage controller (not shown) connected to the bus 606. The mass storage device 614 and its associated computer-storage media may provide non-volatile storage for the computer 600. Although the description of computer-storage media contained herein refers to a mass storage device, such as a hard disk or CD-ROM drive, it should be appreciated by those skilled in the art that computer-storage media can be any available computer storage media that can be accessed by the computer 600.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 112. The computer 600 may connect to the network 112 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, a game controller and a mobile phone. Similarly, the input/output controller 608 may provide output to a display or other type of output device (not shown).

The bus 606 may enable the CPU 602 to read code and/or data to/from the mass storage device 614 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 618 may include software instructions that, when loaded into the processing unit 602 and executed, cause the computer 600 to control components associated with a room. The program modules 618 may also provide various tools or techniques by which the computer 600 may participate within the overall systems or operating environments using the components, flows, and data structures discussed throughout this description.

In general, the program modules 618 may, when loaded into the processing unit 602 and executed, transform the processing unit 602 and the overall computer 600 from a general-purpose computing system into a special-purpose computing system customized to control components associated with a room. The processing unit 602 may be constructed from any number of transistors or other discrete circuit elements, which may individually or collectively assume any number of states. More specifically, the processing unit 602 may operate as a finite-state machine, in response to executable instructions contained within the program modules 618. These computer-executable instructions may transform the processing unit 602 by specifying how the processing unit 602 transitions between states, thereby transforming the transistors or other discrete hardware elements constituting the processing unit 602.

Encoding the program modules 618 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 618 may transform the physical state of the semiconductor memory, when the software is encoded therein. For example, the program modules 618 may transform the state of transistors, capacitors, or other discrete circuit elements constituting the semiconductor memory.

As another example, the computer-storage media may be implemented using magnetic or optical technology. In such implementations, the program modules 618 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for controlling room components using a mobile phone are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for controlling components associated with a room, using a mobile device, the method comprising:
receiving at a meeting controller including a room controller and a presentation controller, from a registered mobile device, a command for controlling at least one component associated with a room;
determining if the command is a room command for controlling a room component associated with the room;
upon determining that the command is a room command for controlling the room component associated with the room, causing the room component to respond to the room command by the room controller;
upon determining that the command is not a room command, determining if the command is a presentation command for controlling a presentation component associated with a presentation;
upon determining that the command is a presentation command for controlling the presentation component associated with a presentation, causing the presentation component to respond to the presentation command by the presentation controller;
determining if the mobile device is authorized to send the command;
upon determining that the mobile device is not authorized to send the command, returning a response to the mobile device that the mobile device is not authorized to send the command; and
upon determining that the mobile device is authorized to send to the command, causing a component associated with the command to respond to the command.

2. The method of claim 1, wherein the mobile device is a mobile phone.

3. The method of claim 2, further comprising:
upon determining that the command is not a room command or a presentation command, determining if the command is an input command for controlling an input switch component; and
in response to determining that the command is an input command, causing the input switch component to respond to the input command.

4. The method of claim 2, wherein causing the room component to respond to the room command comprises transmitting the room command to a room controller configured to identify a room component associated with the room command and to send the room command to the room component associated with the room command, thereby causing the room command to be executed.

5. The method of claim 2, wherein causing the presentation component to respond to the presentation command comprises transmitting the presentation command to a presentation computer configured to send an instruction corresponding to the presentation command to the presentation component associated with the presentation command, thereby causing the presentation command to be executed.

6. The method of claim 1, further comprising:
prior to receiving a command from the mobile phone, receiving a request to register the mobile device;
authenticating the mobile device in response to the request to register the mobile device; and
upon authenticating the mobile device, registering the mobile device.

7. The method of claim 6, wherein authenticating the mobile device comprises:
sending a request to the mobile device for authentication information;
receiving the authentication information in response to the request for authentication information;
determining whether the authentication information received is correct; and
upon determining that the authentication information is correct, registering the mobile device.

8. The method of claim 2, wherein the command for controlling at least one component associated with a room comprises a gesture made with the mobile phone or a gesture made on a screen of the mobile phone.

9. An apparatus for enabling meeting room controls to be controlled using one or more mobile phones, the apparatus comprising:
a meeting controller including a room controller and a presentation controller;
a processor;
a memory for storing computer-readable instructions, which when executed by the processor, causes the processor to
receive, from a registered mobile phone, a command for controlling at least one component,
determine if the command is a room command for controlling a room component associated with the room,
upon determining that the command is a room command for controlling the room component associated with the room, cause the room component to respond to the room command by the room controller,
upon determining that the command is not a room command, determine if the command is a presentation command for controlling a presentation component associated with a presentation, and
upon determining that the command is a presentation command for controlling the presentation component associated with a presentation, cause the presentation component to respond to the presentation command by the presentation controller,
determining if the mobile phone is authorized to send the command;
upon determining that the mobile phone is not authorized to send the command, returning a response to the mobile phone that the mobile phone is not authorized to send that command; and
upon determining that the mobile phone is authorized to send the command, causing a component associated with the command to respond to the command.

10. The apparatus of claim 9, wherein the processor is further configured to:
upon determining that the command is not a room command or a presentation command, determine if the command is an input command for controlling an input switch component; and
upon determining that the command is an input command, to cause the input switch component to execute the input command.

11. The apparatus of claim 9, wherein causing the room component to respond to the room command comprises passing the room command to a room controller configured to identify a room component associated with the room command and to send an instruction corresponding to the room command to the room component associated with the room command, thereby causing the room command to be executed.

12. The apparatus of claim 9, wherein causing the presentation component to respond to the presentation command comprises passing the presentation command to a presentation computer configured to execute the presentation command, thereby causing the presentation command to be executed.

13. The apparatus of claim 9, wherein the processor is further configured to:
upon receiving a command from the mobile phone, determine if the mobile phone is authorized to send a command;
upon determining that the mobile phone is not authorized to send a command, return a response to the mobile phone that the mobile phone is not authorized to send a command; and
upon determining that the mobile phone is authorized to send a command, cause a component associated with the command to respond to the command.

14. The apparatus of claim 9, wherein the processor is further configured to:
receive a request to register the mobile phone prior to receiving a command from the mobile phone;
authenticate the mobile phone upon receiving the request; and
upon authenticating the mobile phone, register the mobile phone.

15. The apparatus of claim 14, wherein registering the mobile phone comprises:
adding an identifier associated with the mobile phone to a registered list;
defining the time period for which the mobile phone is registered; and
notifying the mobile phone that the mobile phone has been registered.

16. The apparatus of claim 9, wherein the command for controlling at least one component associated with a room comprises a gesture made with the mobile phone or a gesture made on a screen of the mobile phone.

17. A mobile phone for controlling components associated with a meeting room, comprising:
- a processor;
- a memory;
- a control application comprising computer-readable instructions stored in the memory which, when executed by the processor, causes the processor to
    - receive a request from a gateway for authentication credentials of a user using the mobile phone;
    - transmit authentication credentials to the gateway;
    - receive registration notification from the gateway that the mobile phone is registered to transmit a command to a meeting controller;
    - receive a gesture,
    - determine if the received gesture represents a command for controlling at least one component associated with the meeting room, and
    - upon determining that the received gesture represents the command for controlling at least one component associated with the meeting room, to transmit the command to the gateway, wherein the gateway is configured to transmit the command to the meeting controller that controls one of a room component by a room controller associated with the meeting controller, or a presentation component by a presentation controller associated with the meeting controller.

18. The mobile phone of claim 17, wherein the mobile phone further comprises a touch screen, and wherein the control application is further configured when executed by the processor to cause the processor to:
- present a user interface control on the touch screen;
- upon presenting the user interface control on the touch screen, receive an input selecting a component to control; and
- upon receiving an input selecting a component to control, operate in a gesture recognition mode to receive the gesture.

19. The mobile phone of claim 18, wherein the gesture comprises a gesture made with the mobile phone or a gesture made on the touch screen of the mobile phone.

* * * * *